US011948292B2

(12) United States Patent
Yoon et al.

(10) Patent No.: US 11,948,292 B2
(45) Date of Patent: Apr. 2, 2024

(54) SYSTEMS AND METHODS FOR DETECTING FLAWS ON PANELS USING IMAGES OF THE PANELS

(71) Applicant: MakinaRocks Co., Ltd., Seoul (KR)

(72) Inventors: Andre S. Yoon, Seoul (KR); Sangwoo Shim, Sokcho-si (KR); Yongsub Lim, Gunpo-si (KR); Ki Hyun Kim, Yongin-si (KR); Byungchan Kim, Seoul (KR); JeongWoo Choi, Seoul (KR); Jongsun Shinn, Seoul (KR)

(73) Assignee: MakinaRocks Co., Ltd., Seoul (KR)

( * ) Notice: Subject to any disclaimer, the term of this patent is extended or adjusted under 35 U.S.C. 154(b) by 267 days.

(21) Appl. No.: 16/918,994

(22) Filed: Jul. 1, 2020

(65) Prior Publication Data

US 2021/0004946 A1    Jan. 7, 2021

Related U.S. Application Data

(60) Provisional application No. 62/869,919, filed on Jul. 2, 2019.

(30) Foreign Application Priority Data

Apr. 6, 2020   (KR) .................. 10-2020-0041480

(51) Int. Cl.
*G06T 7/00* (2017.01)
*G06T 1/20* (2006.01)

(52) U.S. Cl.
CPC ............... *G06T 7/001* (2013.01); *G06T 1/20* (2013.01); *G06T 2207/30108* (2013.01)

(58) Field of Classification Search
CPC .. A61B 5/7485; G06K 9/6256; G06K 9/6224; G06N 3/02; G06N 3/04;
(Continued)

(56) References Cited

U.S. PATENT DOCUMENTS 10,346,969 B1 *  7/2019  Raghu et al. ......... G06T 7/0008
                                                     348/131
2008/0032429 A1 *  2/2008  Chen ...................... G06T 7/001
                                                      438/14
(Continued)

FOREIGN PATENT DOCUMENTS

CN    110959114 A1 *  4/2020  ........... G06T 7/0004
JP    2005156334 A      6/2005
(Continued)

OTHER PUBLICATIONS

Office Action dated May 26, 2022 in Korean Application No. 10-2020-0022453, with machine translation by Google, 12 pages.
(Continued)

*Primary Examiner* — Gandhi Thirugnanam
(74) *Attorney, Agent, or Firm* — Sheppard Mullin Richter & Hampton LLP

(57) ABSTRACT

Disclosed is a non-transitory computer readable medium storing a computer program, in which when the computer program is executed by one or more processors of a computing device, the computer program performs operations to provide methods for detecting flaws, and the operations may include: extracting a flaw patch from a flaw image including a flaw; preprocessing at least one of the flaw image or non-flaw image not including a flaw; extracting a non-flaw patch from at least one of the preprocessed flaw image or non-flaw image; and training a neural network model for classifying patches to flaw or non-flaw with a training data set including the flaw patch and the non-flaw patch.

18 Claims, 11 Drawing Sheets

(58) Field of Classification Search
CPC .......... G06N 3/0454; G06N 3/08; G06T 1/20;
G06T 2207/20021; G06T 2207/20081;
G06T 2207/20084; G06T 2207/20112;
G06T 2207/30108; G06T 7/0002; G06T
7/0004; G06T 7/001; G06T 7/0014; G06T
7/248; G06T 7/337; G06T 7/74; G06T
2207/20; G06T 2207/30; G06T
2207/30121; G06T 2207/30136; G06T
7/10; G06T 7/11; G06T 7/136; G06V
20/695; G06V 20/698; G06V 20/80;
G06V 40/162
See application file for complete search history.

(56) References Cited

U.S. PATENT DOCUMENTS

| | | | | |
|---|---|---|---|---|
| 2009/0080759 | A1* | 3/2009 | Bhaskar | .................. G06T 7/001 |
| | | | | 382/141 |
| 2012/0230591 | A1* | 9/2012 | Shibata | .................. G06T 5/005 |
| | | | | 382/218 |
| 2015/0131891 | A1* | 5/2015 | Kim | .................. G06T 7/001 |
| | | | | 382/144 |
| 2016/0026913 | A1 | 1/2016 | Moon et al. | |
| 2017/0243132 | A1 | 8/2017 | Sainani et al. | |
| 2019/0197678 | A1* | 6/2019 | Yao et al. | .................. G06T 7/001 |
| | | | | 345/505 |
| 2019/0258890 | A1 | 8/2019 | Lee | |
| 2019/0303717 | A1* | 10/2019 | Bhaskar et al. | ..... G06K 9/6256 |
| | | | | 382/157 |
| 2020/0088862 | A1* | 3/2020 | Lundberg et al. | .... G01S 7/5205 |
| | | | | 367/7 |
| 2021/0004946 | A1* | 1/2021 | Yoon | .................. G06T 1/20 |
| 2021/0027440 | A1 | 1/2021 | Sakuyama et al. | |
| 2021/0337073 | A1* | 10/2021 | Lin | .................. G06V 30/40 |
| 2022/0134435 | A1* | 5/2022 | Scime | .................. G06T 7/11 |
| | | | | 264/112 |

FOREIGN PATENT DOCUMENTS

| | | |
|---|---|---|
| JP | 2010203845 A | 9/2010 |
| JP | 2017166957 A | 9/2017 |
| KR | 20160012537 A | 2/2016 |
| KR | 20190101874 A | 9/2019 |

OTHER PUBLICATIONS

Dudley, John J., et al., "A Review of User Interface Design for Interactive Machine Learning", ACM Transactions on Interactive Intelligent Systems, vol. 1, No. 1, Article 1, Mar. 2018 (Year: 2018), 37 pages.

Shrestha, Chandani, "A Web Based User Interface for Machine Learning Analysis of Health and Education Data", UNLV Theses, Dissertations, Professional Papers, and Capstones, May 2016 (Year: 2016), 65 pages.

Yu, Zhiyang, et al., "Fully Convolutional Networks for Surface Defect Inspection in Industrial Environment", ICVS 2017, Computer Vision Systems, pp. 417-426.

Korean Patent Application No. 10-2020-0041480, Search Report dated Oct. 22, 2021, 5 pages.

\* cited by examiner

SYSTEMS AND METHODS FOR DETECTING FLAWS ON PANELS USING IMAGES OF THE PANELS

CROSS-REFERENCE TO RELATED APPLICATIONS

This application claims priority to and the benefit of Korean Patent Application No. 10-2020-0041480 filed in the Korean Intellectual Property Office on Apr. 6, 2020, and U.S. Provisional Patent Application No. 62/869,919 filed in the United States Patent and Trademark Office on Jul. 2, 2019 the entire contents of which are incorporated herein by reference.

TECHNICAL FIELD

The present disclosure relates to an artificial intelligence technology field, and more particularly, to flaw detection utilizing artificial intelligence technology.

BACKGROUND ART

Currently, in most manufacturing industries, humans are visually inspecting whether a product has a flaw. For example, in a process for manufacturing a vehicle, whether a panel obtained during the process (for example, a panel made of steel, aluminum, plastic, etc.) or the panels obtained after the process is completed have the flaw can be visually inspected by the humans. If the panel has cracks, necking, etc., it may be determined that the panel has the flaw.

However, in an existing scheme in which the humans visually inspect products obtained in the process, time and cost consumption is significant. Moreover, in the existing inspection method for the product, accuracy may vary depending on proficiency of a person, a criterion for determining whether there is the flaw may vary according to a personal subject of the person who inspects the products, and it may be difficult to leave an accurate record.

Accordingly, there is a need for a convenient and highly accurate method for inspecting the flaw of the product is a manufacturing industry.

Korean Patent Unexamined Publication No. 2016-0012537 discloses a neutral network training method and an apparatus, and a data processing apparatus.

SUMMARY OF THE INVENTION

The present disclosure has been made in an effort to provide a method for detecting flaws.

An exemplary embodiment of the present disclosure provides a non-transitory computer readable medium storing a computer program, in which when the computer program is executed by one or more processors of a computing device, the computer program performs operations to provide methods for detecting flaws, and the operations may include: extracting a flaw patch from a flaw image including a flaw; preprocessing at least one of the flaw image or non-flaw image not including a flaw; extracting a non-flaw patch from at least one of the preprocessed flaw image or non-flaw image; and training a neural network model for classifying patches to flaw or non-flaw with a training data set including the flaw patch and the non-flaw patch.

In an alternative exemplary embodiment of the computer program operations which perform the following operations for detecting flaws, the flaw image may be labeled one or more flaw regions in advance.

In an alternative exemplary embodiment of the computer program operations which perform the following operations for detecting flaws, the flaw patch may be portion region with a predetermined size extracted from the flaw image, and the non-flaw patch may be portion region with a predetermined size extracted from at least one of the flaw image or the non-flaw image.

In an alternative exemplary embodiment of the computer program operations which perform the following operations for detecting flaws, the flaw patch may include one or more flaw regions included in the flaw image, and the non-flaw patch may not include the one or more flaw regions included in the flaw image.

In an alternative exemplary embodiment of the computer program operations which perform the following operations for detecting flaws, the operation of extracting a flaw patch from a flaw image with flaws, may include at least one of: extracting the flaw patch so that at least one of the flaw regions is included in a center of the flaw patch; extracting the flaw patch so that at least one of the flaw regions is included in a center of the flaw patch; extracting the flaw patch so that a predetermined number or more of flaw regions are included in the flaw patch; or extracting the flaw patch so that a predetermined number or more of flaw regions placed side by side continuously are included in the flaw patch.

In an alternative exemplary embodiment of the computer program operations which perform the following operations for detecting flaws, the operations may further include preprocessing the flaw patch; and the training data set may include the preprocessed flaw patch.

In an alternative exemplary embodiment of the computer program operations which perform the following operations for detecting flaws, the operation of preprocessing at least one of the flaw image or a non-flaw image not including the flaw, may include at least one of removing a noise included in a preprocessing target image which is at least one of the flaw image or the non-flaw image; removing a feature less than a predetermined size included in the preprocessing target image; removing a gap between two or more features, if a distance of the two or more features included in the preprocessing target image is less than a predetermined distance; or smoothing a boundary of a feature included in the preprocessing target image.

In an alternative exemplary embodiment of the computer program operations which perform the following operations for detecting flaws, the operation of preprocessing at least one of the flaw image or a non-flaw image not including the flaw, may include converting a preprocessing target image, which is at least one of the flaw image or the non-flaw image, to a binary image; obtaining an inversed image by inverting a binary value included in the binary image; obtaining an opened image by opening the inversed image; and obtaining a preprocessed image including a difference value between the inversed image and the opened image.

In an alternative exemplary embodiment of the computer program operations which perform the following operations for detecting flaws, the operation of obtaining an opened image by opening the inversed image, may include removing a feature less than a predetermined size included in the inversed image.

In an alternative exemplary embodiment of the computer program operations which perform the following operations for detecting flaws, the operation of preprocessing at least one of the flaw image or a non-flaw image not including the flaw, may include converting a preprocessing target image, which is at least one of the flaw image or the non-flaw image, to a binary image; obtaining a closed image by closing the binary image; obtaining a differential image including a difference value between the inversed image and the closed image; and obtaining a preprocessed image by inverting a binary value included in the differential image.

In an alternative exemplary embodiment of the computer program operations which perform the following operations for detecting flaws, the operation of obtaining a closed image by closing the binary image, may include at least one of removing a gap between two or more of features, when a distance of the two or more of features included in the binary image is less than a predetermined distance; or smoothing a boundary of a feature included in the binary image.

In an alternative exemplary embodiment of the computer program operations which perform the following operations for detecting flaws, a proportion between the number of flaw patches and the number of non-flaw patches included in the training data set may be determined by a predetermined balance proportion.

In an alternative exemplary embodiment of the computer program operations which perform the following operations for detecting flaws, the operation of training a neural network model for classifying patches to flaw or non-flaw with a training data set including the flaw patch and the non-flaw patch, may include training different neural network models for each patch size.

In an alternative exemplary embodiment of the computer program operations which perform the following operations for detecting flaws, the operations may further include: extracting one or more patches from a classification target image; classifying the one or more patches to flaw or non-flaw patches by computing using the trained neural network model; and determining that a flaw is included in the classification target image when a predetermined number or more of patches among one or more patches are classified as flaw patches.

In an alternative exemplary embodiment of the computer program operations which perform the following operations for detecting flaws, the flaw image and the non-flaw image may be at least one of an image of the product after a manufacturing process is completed, or an image of the product during a manufacturing process.

In an alternative exemplary embodiment of the computer program operations which perform the following operations for detecting flaws, the operations may further include: computing an image obtained during a manufacturing process by the trained neural network model; extracting an additional flaw patch based on the image obtained during a manufacturing process, when it is determined that a flaw is included in the image obtained during a manufacturing process; and adding the additional flaw patch to the training data set.

Another exemplary embodiment of the present disclosure provides a method for detecting flaws may include: extracting a flaw patch from a flaw image including a flaw; preprocessing at least one of the flaw image or non-flaw image not including a flaw; extracting a non-flaw patch from at least one of the preprocessed flaw image or non-flaw image; and training a neural network model for classifying patches to flaw or non-flaw with a training data set including the flaw patch and the non-flaw patch.

Still another exemplary embodiment of the present disclosure provides a server for detecting flaws may include: a processor including one or more cores; and a memory, and the processor may be configured to: extract a flaw patch from a flaw image including a flaw; preprocess at least one of the flaw image or non-flaw image not including a flaw; extract a non-flaw patch from at least one of the preprocessed flaw image or non-flaw image; and train a neural network model for classifying patches to flaw or non-flaw with a training data set including the flaw patch and the non-flaw patch.

Yet another exemplary embodiment of the present disclosure provides a non-transitory computer readable medium storing data structure corresponding to a parameter of a neural network at least partially updated in training processes, in which operations of the neural network are based on at least partially the parameter, and the training process may include: extracting a flaw patch from a flaw image including a flaw; preprocessing at least one of the flaw image or non-flaw image not including a flaw; extracting a non-flaw patch from at least one of the preprocessed flaw image or non-flaw image; and training a neural network model for classifying patches to flaw or non-flaw with a training data set including the flaw patch and the non-flaw patch.

According to an exemplary embodiment of the present disclosure, a method for detecting flaws can be provided.

DETAILED DESCRIPTION

Figure 1:
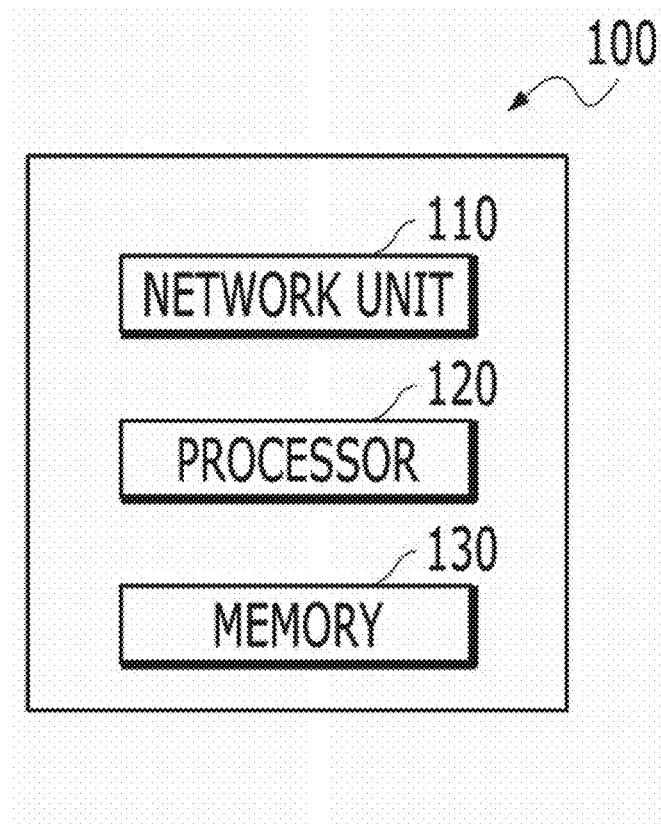
FIG. 1 is a block diagram of a computing device for performing an operation for providing a method for detecting flaws according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the hardware and the software, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, or the case where X uses both A and B. Further, it should be understood that the term "and/or" used in the specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in the present specification and the claims.

Those skilled in the art need to additionally recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In an exemplary embodiment of the present disclosure, a server may include a predetermined type of computing device. The server as a digital device may be a digital device with a calculation capability, which has a processor installed therein and a memory, such as a laptop computer, a notebook computer, a desktop computer, a web pad, or a mobile phone. The server may be a web server that processes a service. A type of server described above is just an example and the present disclosure is not limited thereto.

FIG. 1 is a block diagram of a computing device for performing an operation for providing a method for detecting flaws according to an exemplary embodiment of the present disclosure.

With the development of a manufacturing industry, flaws in products detected in a manufacturing process have been significantly reduced. As a result, an image with a flaw (i.e., flaw image) is more difficult to acquire than an image with no flaw (i.e., non-flaw image). In a general training data set, the number of normal data and the number of abnormal data are proportional to each other, thereby maintaining a balance. However, in the case of the manufacturing industry, it has become difficult to acquire the flaw image in recent years, and in the learning data set, a case where the number of non-flaw images is larger than the number of flaw images occurs. When a neutral network is trained by a training data set including an unbalanced number of normal and abnormal data without refinement of the image obtained in the manufacturing industry, a training capability may be distorted. Moreover, even in the flaw image with the flaw, a large portion of the image may be a portion not related to the flaw and only a small portion may be a portion related to the flaw. That is, since a size of the flaw is small, a pixel corresponding to the flaw in the flaw image may be a very small portion. Accordingly, when a data set (e.g., image set) collected in a manufacturing environment is generally compared with the data set used for the neural network training, both data sets may have different properties. It may be more difficult to train a deep learning algorithm/neural network model due to an unbalance problem between classified images (e.g., classification of the flaw image and the non-flaw image).

Building a good quality training data set is related to manufacturing productivity. Data needs to be collected in a state in which the manufacturing environment is controlled in order to build the good quality training data set, but this may affect the manufacturing process. Manufacturers do not want to increase or delay a time required for the process. The manufacturers may avoid collecting data across the entire process with controlled manufacturing environments due to issues such as a process consumption time. The manufacturers may prefer to collect data after the process is completed, or capture the data to create a data set without the manufacturing environment being controlled. However, when the training data set is created based on data (or images) collected in an uncontrolled environment, the created training data set may have a great influence on the quality of the data set.

The description of the flaw detection method of the present disclosure is also discussed in US provisional patent application U.S. 62/869,919, which is incorporated herein by reference in its entirety.

Figure 2:
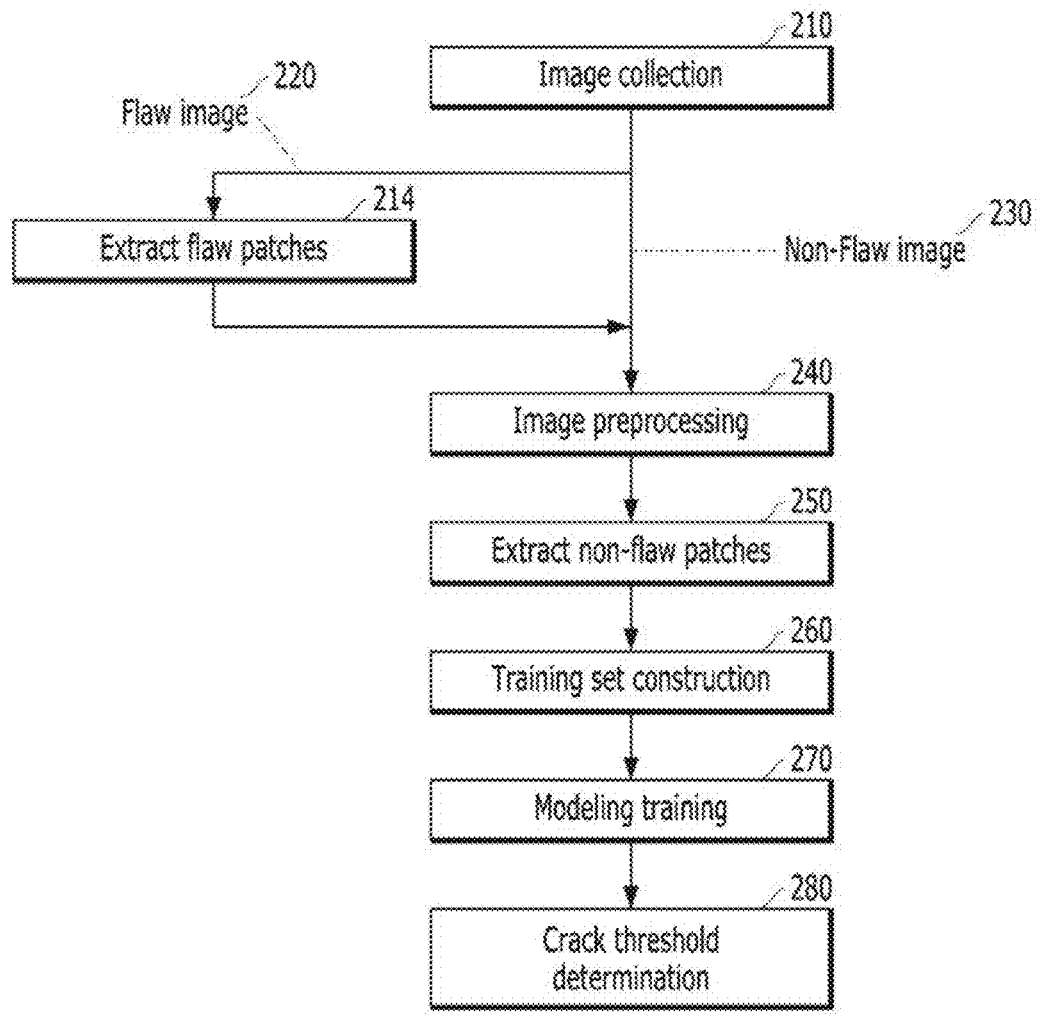
FIG. 2 is a flowchart exemplarily illustrating a method for creating a model for flaw detection according to an exemplary embodiment of the present disclosure.

FIG. 2 is a flowchart exemplarily illustrating a method for creating a model for flaw detection according to an exemplary embodiment of the present disclosure. The flowchart of FIG. 2 may illustrate a process of training the neural network model for flaw detection.

The processor 120 may obtain images (210). The images may include a non-flaw image 230 and a flaw image 220. The processor 120 may obtain the non-flaw image and the flaw image which are manufacturing images. The processor 120 may classify the obtained images to the non-flaw image 230 and the flaw image 220. Each of the non-flaw image and the flaw image may be an image obtained in the manufacturing process. Each of the non-flaw image and the flaw image may be an image obtained by photographing the product after the manufacturing process is completed. Alternatively, each of the non-flaw image and the flaw image may be an image obtained by photographing the product during the manufacturing process.

The flaw image may be an image including the flaw. At least a partial region of the flaw image may be a region related to the flaw. At least a partial pixel of the flaw image may be a pixel related to the flaw. The flaw image may be an image obtained by photographing the product with the flaw.

The flaw image may be labeled one or more flaw regions in advance. The flaw region may be at least a partial region of the image related to the flaw. For example, the flaw region may be the pixel related to the flaw or a set of one or more pixels related to the flaw. For example, the flaw region may be a pixel for the corresponding flaw in the image obtained by photographing the product with the flaw. In other words, the region may mean a pixel unit or a set of one or more pixels. Labeling of the flaw region may be displaying of the flaw region. The labeling of the flaw region may be, for example, masking (e.g., highlighted or selected) for a partial region included in the image. Each of the pixels included in the flaw image may be labeled flaw or non-flaw. Labeling may include information on which pixel among the pixels included in the image is related to the flaw. The labeling may include information on which pixel among the pixels included in the image is not related to the flaw. The detailed description of the flaw region is just an example and the present disclosure is not limited thereto.

The non-flaw image may be an image not including the flaw. The non-flaw image may be an image obtained by photographing the product with no flaw.

The flaw may include a predetermined abnormal state which may occur in the manufacturing environment. The flaw may include a predetermined abnormal state which may occur in the product. For example, the flaw may include a crack, necking, etc. The crack may mean a phenomenon in which the surface of the product is cracked. The necking may be a phenomenon which appears in a non-uniform product. The necking may mean that a concave portion is formed on a boundary of a stretched portion and a non-stretched portion when a part of the manufacture is stretched and another part is not stretched. The crack may be partially detectable when the human visually inspects the product. However, it is possible for the human to visually detect all cracks from the manufacture or the image obtained by photographing the manufacture and in many cases, a detailed crack may not be visually detected by the human. The necking is very low in detection probability when the human visually inspects the manufacture or the image obtained by photographing the product. Accordingly, there is a need in the art for a method that may accurately detect even a flaw which the human hardly detects. The detailed description of the flaw is just an example and the present disclosure is not limited thereto.

The product may be obtained during the manufacturing process or obtained after the manufacturing process is completed. For example, in a process for manufacturing a vehicle, the product may be a material, one component, or a finished vehicle for producing the vehicle. For example, the product may be a material which is a panel made of steel, aluminum, etc. The detailed description of the product is just an example and the present disclosure is not limited thereto.

The processor 120 may create/extract a patch from the non-flaw image and the flaw image. The processor 120 may extract a flaw patch from the flaw image (214). The processor 120 may extract a non-flaw patch from at least one of the non-flaw image or the flaw image.

The patch may be at least a partial region of the image extracted from the image. The patch may be a set of one or more pixels extracted from the image. The processor 120 may extract the patch from the image with a predetermined size. The sizes of one or more patches included in the same training data set may be the same as each other. The sizes of one or more patches for training the same neural network model may be the same as each other.

The flaw patch may be a patch extracted from the flaw image. The flaw patch may be a patch having a predetermined size, which is extracted from the flaw image. The flaw patch may include at least one flaw region included in the flaw image. The flaw image may include one or more flaw regions. For example, the flaw image may include one or more flaw pixels. The flaw patch may include at least one flaw pixel. The flaw patch may include the flaw pixel and peripheral pixels of the flaw pixel.

The processor 120 may extract the flaw patch so that at least one flaw region included in the flaw image is included in a center of the patch. The processor 120 may extract the flaw patch so that the flaw region is positioned at a center pixel of the patch. The processor 120 may extract the flaw patch so that some pixels of one or more pixels included in the flaw region are positioned within a predetermined distance from the center pixel of the patch. The processor 120 may extract the flaw patch so that the pixel related to the flaw included in the flaw image becomes the center pixel of the patch. The processor 120 may extract the flaw patch so that at least one flaw pixel of one or more flaw pixels labeled the flaw image or a set of one or more flaw pixels is positioned at the center of the flaw patch. The processor 120 may extract the flaw patch so that the center of the flaw region included in the flaw image is positioned at the center of the flaw patch. For example, the center of the flaw region may be a center of gravity, an inner core of the flaw region, etc., but the present disclosure is not limited thereto. In the present disclosure, the center may mean a pixel region positioned within a predetermined distance from a pixel which becomes the center of a predetermined region.

The processor 120 may extract the flaw patch so that at least one flaw region included in the flaw image is included in a boundary of the patch. The processor 120 may extract the flaw patch so that at least one flaw pixel of one or more flaw pixels included in the flaw image is included in the boundary of the patch. The processor 120 may extract the flaw patch so that at least one flaw pixel of one or more flaw pixels labeled to the flaw image or a set of one or more flaw pixels is positioned on the boundary of the flaw patch. For example, the processor 120 may allow the center or boundary of the flaw region to be included in the boundary of the patch. In the present disclosure, the boundary may mean a pixel region positioned within a predetermined distance from an edge of the image.

The processor 120 may extract the flaw patch so that a predetermined number or more of flaw regions included in the flaw image are included in the patch. The processor 120 may extract the flaw patch so that a predetermined number or more of flaw pixels of one or more flaw pixels included in the flaw image are included in the patch. For example, the processor 120 may extract the flaw patch so that pixels related to five or more of flaws are included in the patch. The concrete description of the flaw patch is just an example and the present disclosure is not limited thereto.

The processor 120 may extract the flaw patch so that a predetermined number or more of consecutive flaw regions arranged side by side, which are included in the flaw image are included in the patch. The processor 120 may extract the flaw patch so that a predetermined number or more consecutive flaw pixels arranged side by side, which are included in the flaw image are included in the patch. The processor 120 may extract the flaw patch so that a set of three or more pixels consecutively arranged side by side among one or more pixels included in the flaw image are included in the flaw patch. The concrete description of the flaw patch is just an example and the present disclosure is not limited thereto.

The processor 120 may preprocess each of the flaw image and the non-flaw image (240). The processor 120 may preprocess the flaw image after extracting the flaw patch. The processor 120 may extract the flaw patch from the flaw image and preprocess remaining regions. A preprocessing method will be described below with reference to FIGS. 5 to 7. Alternatively, the processor 120 may preprocess even the flaw patch.

The processor 120 may extract the non-flaw patch from at least one of the preprocessed flaw image or non-flaw image (250). The processor 120 may extract the non-flaw patch from an image in which the flaw patch is extracted and the remaining regions are preprocessed. The processor 120 may extract the non-flaw patch after preprocessing the non-flaw image. The non-flaw patch may not include one or more flaw regions included in the flaw image. For example, the non-flaw patch may be a region not including the flaw pixel included in the flaw image. The non-flaw patch may be a patch extracted from the non-flaw image. The non-flaw patch may include non-flaw pixels other than the flaw pixel. Alternatively, the non-flaw patch may include the non-flaw pixel at the center and may include a center non-flaw pixel and peripheral pixels thereof. The concrete description of the patch is just an example and the present disclosure is not limited thereto.

Each of the non-flaw image and the flaw image may be separated into one or more patches.

The processor 120 may construct the training data set by using at least some patches of one or more patches extracted from the images (260). The processor 120 may construct the training data set so as to include the flaw patch extracted from the flaw image. The processor 120 may construct the training data set so as to include the preprocessed flaw patch. The preprocessing method for the flaw patch may be the same as the preprocessing method for the image. The processor 120 may construct the training data set so as to include the non-flaw patch extracted from at least one of the flaw image or the non-flaw image.

The training data set may be a set of data used for training the neural network model. The training data set may include one or more training data. The training data may include an image which becomes an input of a neural network and a classification result of the image. Alternatively, the training data may include a patch which becomes the input of the neural network and the classification result of the patch. The neural network model trained by the training data set may classify the image. The neural network model trained by the training data set may classify the image into the non-flaw image or the flaw image. The training data set may include the flaw image or the flaw patch so that the neural network detects the flaw. The training data set may include the non-flaw image or the non-flaw patch so that the neural network detects the flaw. The training data set may include, for example, ten thousands of images or patches. The training data set may be, for example, a Modified National Institute of Standards and Technology database (MNIST) data set, a Canadian Institute For Advanced Research-10 (CIFAR-10) data set, and an ImageNet data set. The training data set may include a well-balanced number of training data for each class. The detailed description of the training data set is just an example and the present disclosure is not limited thereto.

The training data set may include a well-balanced number of training data for each classification class for classification of the image. A proportion between the number of flaw patches and the number of non-flaw patches included in the training data set may be determined by a predetermined balance proportion. The predetermined balance proportion may be an optimized proportion for enhancing a classification performance of the neural network model. For example, the predetermined proportion may be 1 to 1 for each of the non-flaw patch and the flaw patch. For example, the training data set may include each of non-flaw patches and flaw patches of the same number. The detailed description of the training data set is just an example and the present disclosure is not limited thereto.

As described above, when the number of training data corresponding to each of two or more classes is unbalanced, there may be a serious problem in training efficiency. Instead of constructing the training data set by using the non-flaw image and the flaw image, a plurality of flaw patches may be obtained by constructing the training data set by using the non-flaw patch and the flaw patch. In other words, in the case of constructing the training data set by using the flaw patches, more training data related to a flaw class may be included than in the case of constructing the training data set by using the flaw image. Accordingly, when the training data set is constructed by using the patches instead of the image, an unbalance problem between the classes may be resolved.

The processor 120 may train the neural network model by using the training data set (270).

The neural network model of the present disclosure may be configured by a teacher training model. In the embodiment of the present disclosure, which is configured by the teacher training model, the teacher training model may receive the non-flaw patch or the flaw patch as the input and output whether there is the flaw for the non-flaw patch or the flaw patch as an output. The teacher training model may be trained by using a training non-flaw patch and a training flaw-patch included in the training data set, and whether there is the flaw labeled thereto.

The neural network model of the present disclosure may be configured by a non-teacher training model. The non-teacher training model may include a model capable of clustering input data. The non-teacher training model may be, for example, a model configured by a neural network that restores the input data. The non-teacher training model may include, for example, an auto encoder. The non-teacher training model may be trained by using the training non-flaw patch or flaw patch, and whether there is the flaw matched with training input data.

A description of a detailed configuration for the neural network model of the present disclosure is discussed in more detail in U.S. Pat. No. 9,870,768B2, the entire contents of which are incorporated herein by reference in this application.

A flaw threshold number may be determined in order to determine whether there is the flaw in the image (280). The flaw threshold number may be a threshold number of flaw patches included in one image for determining the image as the flaw image. In an inference step, when patches of the flaw threshold number or more among a plurality of patches included in the one image are the flaw patches, the processor 120 may determine the corresponding image as the flaw image. For example, when the flaw threshold number is 5 and the number of flaw patches among the plurality of patches separated from the image is 5 or more, the processor 120 may determine the corresponding image as the flaw image. Alternatively, when patches less than the flaw threshold number among the plurality of patches included in the one image are the flaw patches, the processor 120 may determine the corresponding image as the non-flaw image. The detailed description of the flaw threshold number is just an example and the present disclosure is not limited thereto.

According to an embodiment of the present disclosure, the flaw threshold number may be determined by the trained neural network model. The processor 120 may determine the flaw threshold number by the training data set and the trained neural network model. The processor 120 may compute each of one or more flaw images by using the trained neural network models. The processor 120 may check the number of patches determined as the flaw patch for each of the one or more flaw images in the trained neural network model. The processor 120 may determine the flaw threshold number based on the number of flaw patches included in the flaw images. The processor 120 may determine the minimum number of flaw patches included in the flaw image as the flaw threshold number, for example. For example, the processor 120 may determine the numbers of flaw patches included in the plurality of flaw images as 5, 7, 10, 6, and 13, respectively through computation using the trained neural network model. The processor 120 may determine an image including at least five flaw patches as the flaw image based on the result. The processor 120 may determine the flaw threshold number as 5. The detailed description of the flaw threshold number is just an example and the present disclosure is not limited thereto.

Figure 3:
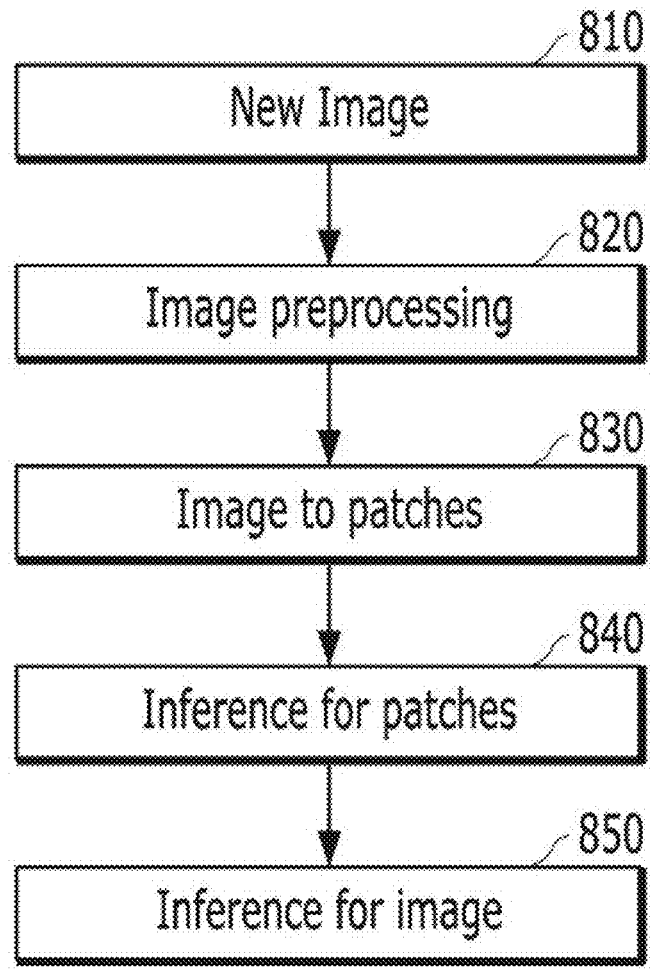
FIG. 3 is a flowchart exemplarily illustrating a method for computing a model for flaw detection according to an exemplary embodiment of the present disclosure.

Hereinafter, an inference method of the trained neural network model will be described. FIG. 3 is a flowchart exemplarily illustrating a method for computing a model for flaw detection according to an exemplary embodiment of the present disclosure.

The processor 120 may receive a classification target image (810). The classification target image may be an image without information on non-flaw or flaw. The classification target image may be an image for which determination for the non-flaw or flaw is required by using the neural network model. The classification target image may be an image obtained in association with a manufacturing process. The classification target image may be an image obtained by photographing the product in association with the manufacturing process. The classification target image may be an image obtained by photographing the product after the manufacturing processing is completed or during the manufacturing process.

The processor 120 may preprocess the classification target image (820). Preprocessing for the classification target image and preprocessing of the image include in the training data during an inference process may be performed in a similar method.

The processor 120 may extract one or more patches from the classification target image (830). The processor 120 may extract patches with a predetermined size from the classification target image.

The processor 120 may compute one or more patches by using the trained neural network models (840). The processor 120 may classify each of one or more patches into the non-flaw or flaw by using the trained neural network models. When at least one flaw region is included in the patch, the processor 120 may determine the patch as the flaw patch. When a central region of the patch is the flaw region, the processor 120 may determine the patch as the flaw patch. When a boundary region of the patch is the flaw region, the processor 120 may determine the patch as the flaw patch. When a predetermined number or more of regions included in the patch are the flaw regions, the processor 120 may determine the patch as the flaw patch. When a predetermined number or more of consecutive regions arranged side by side, which are included in the patch are the flaw regions, the processor 120 may determine the patch as the flaw patch.

The processor 120 may determine whether the classification target image has the flaw by using a non-flaw or flaw classification result for the plurality of patches extracted from one classification target image (850). The processor 120 may determine whether one classification target image has the flaw by synthesizing the non-flaw or flaw classification result for the plurality of patches. When a flaw threshold number or more of patches extracted from the classification target image are determined as the flaw patch, the processor 120 may determine the classification target image as the flaw image including the flaw. Alternatively, when patches less than the flaw threshold number among the patches extracted from the classification target image are determined as the flaw patches, the processor 120 may determine the classification target image as the non-flaw image not including the flaw. For example, when the flaw threshold number is 5 and the neural network model determines 6 patches among the patches extracted from the classification target image as the flaw patch, the classification target image may be determined as the flaw image. The detailed description of the inference method is just an example and the present disclosure is not limited thereto.

Figure 4:
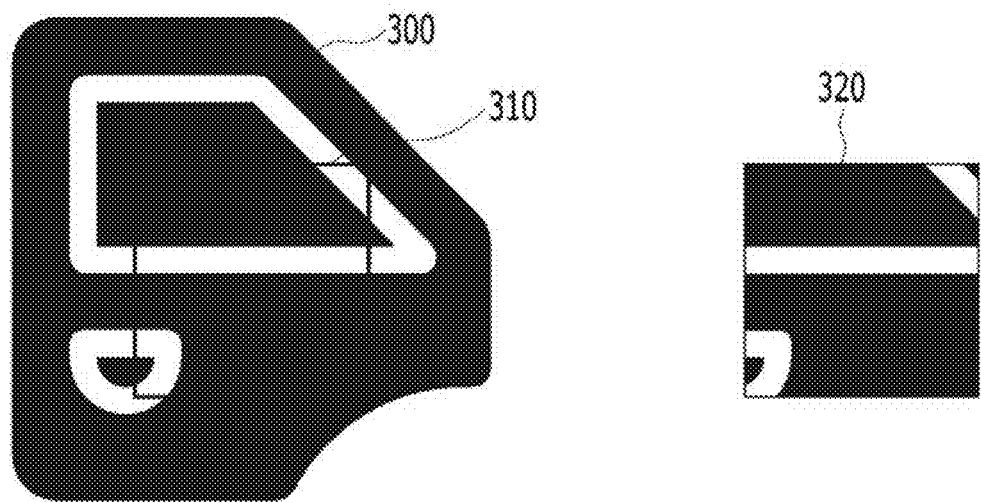
FIG. 4 is a diagram exemplarily illustrating a method for extracting a patch from an image for flaw detection according to an exemplary embodiment of the present disclosure.

FIG. 4 is a flowchart exemplarily illustrating a method for extracting a patch from an image for flaw detection according to an exemplary embodiment of the present disclosure. FIG. 4 exemplarily illustrates an original image 300, a partial region 310 for extracting the patch from the original image, and a patch 320 extracted from the original image. The patch may have various sizes. According to an exemplary embodiment of the present disclosure, the size of the patch may be determined by the person. Alternatively, the size of the patch may be determined by the computation of the computing device. The size of the patch may be associated with the hyper-parameter (or free parameter) of the neural network model. In general, when the size of the patch is too small, the patch may not be insufficient to contain information related to the flaw. In addition, when the size of the path is too large, time, cost, or computing power consumption may be too large for training and inferring the neural network model. Further, when the size of the patch is too large, the number of patches which may be extracted from one image is too small, and as a result, it may be difficult to obtain sufficient training data.

Figure 5:
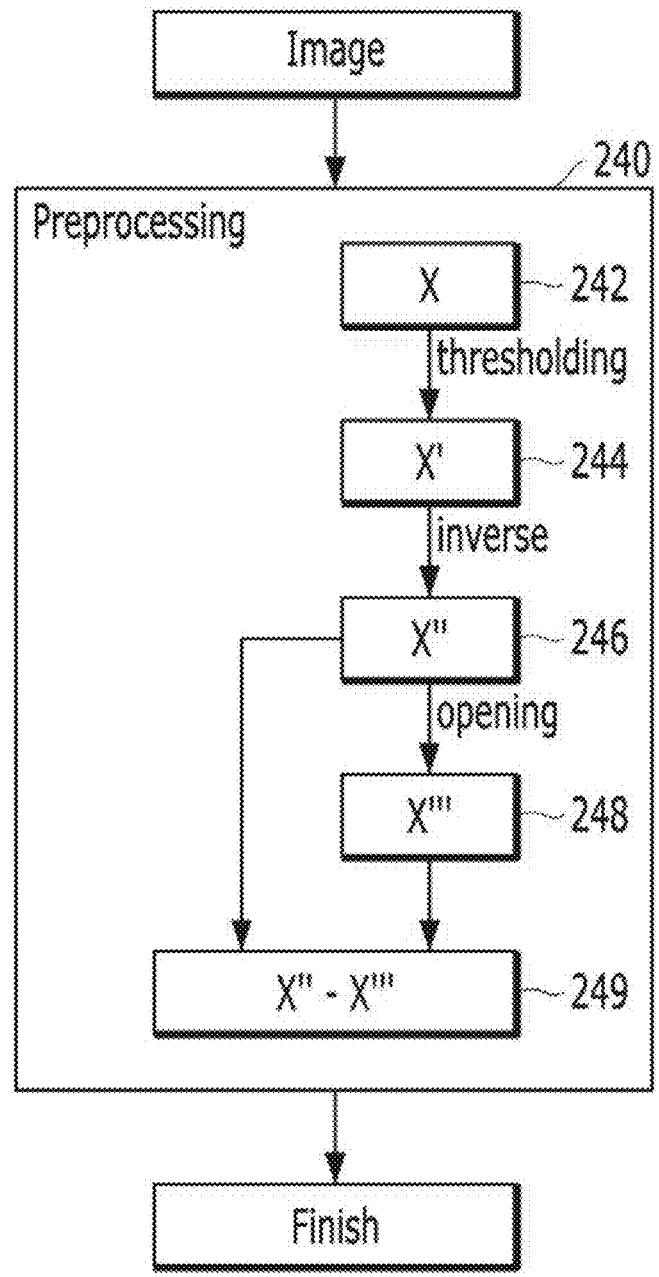
FIG. 5 is a flowchart exemplarily illustrating a preprocessing method for flaw detection according to an exemplary embodiment of the present disclosure.
Figure 6:
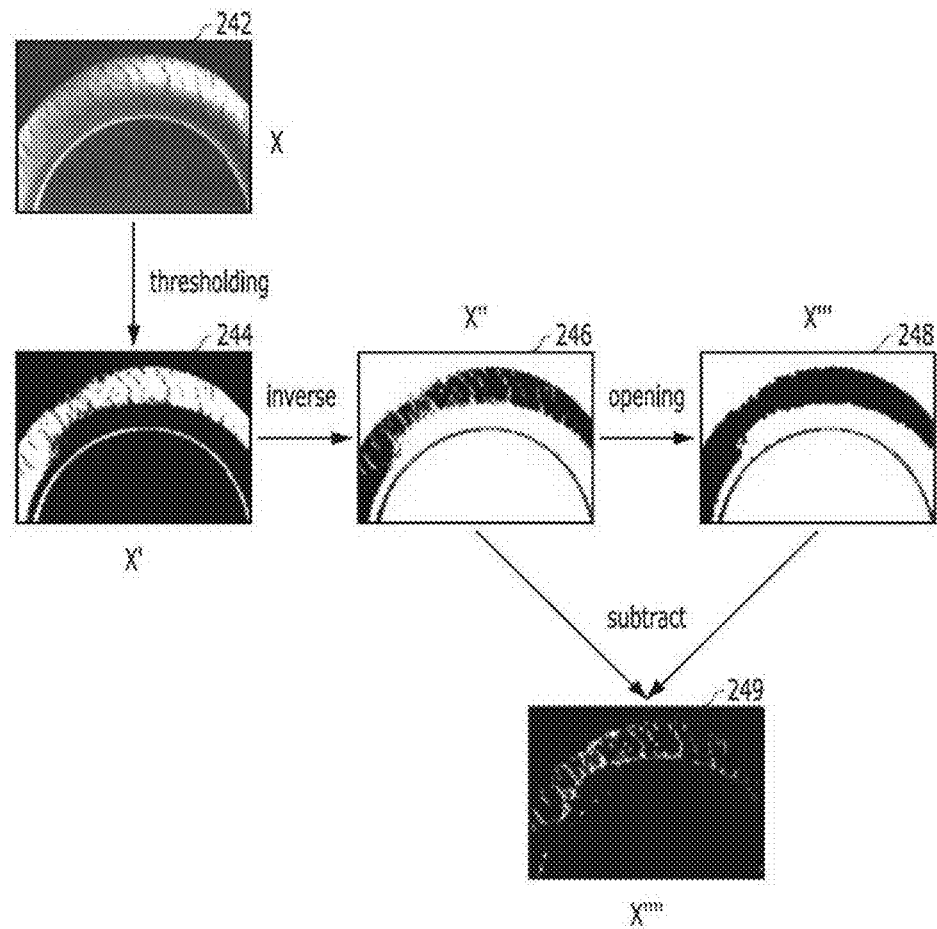
FIG. 6 is a diagram exemplarily illustrating a preprocessing method for flaw detection according to an exemplary embodiment of the present disclosure.
Figure 7:
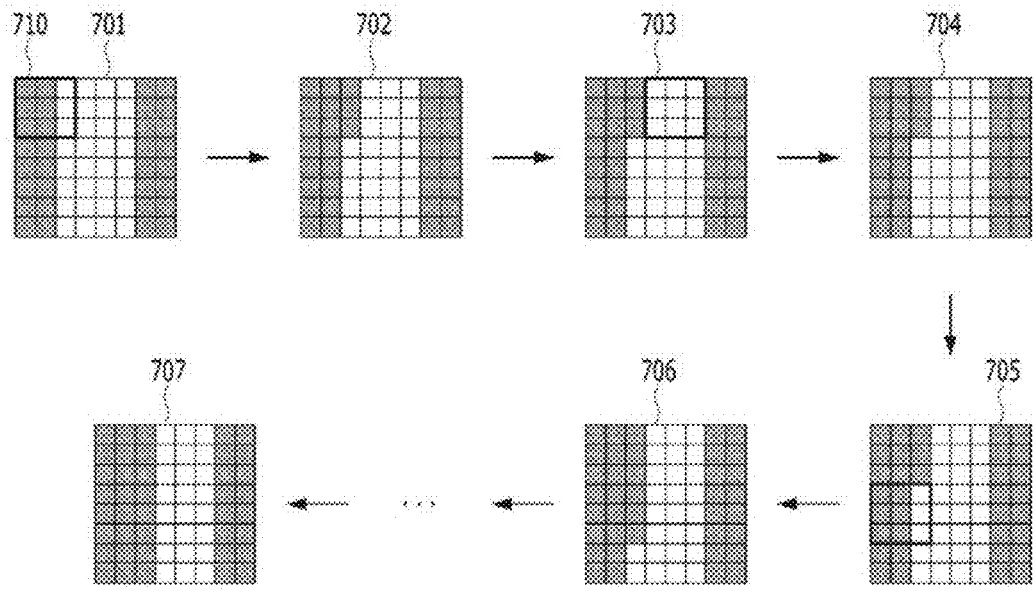
FIG. 7 is a diagram exemplarily illustrating an image converting method according to an exemplary embodiment of the present disclosure.

Hereinafter, a method for preprocessing the image or patch will be described with reference to FIGS. 5, 6, and 7. FIGS. 5 to 7 are diagrams exemplarily illustrating a preprocessing method for flaw detection according to an exemplary embodiment of the present disclosure.

The preprocessing (240) may be constituted by four steps. The preprocessing 240 according to an exemplary embodiment of the present disclosure may include a thresholding step, an inverse step, an opening step, and a differential step for the image.

The processor 120 may threshold an original image X 242. The processor 120 may create a binary image X' 244 by thresholding the original image X 242. The thresholding for the image may be a method for binarizing the image. The binary image may be an image obtained by expressing the image as two class classifications. For example, the binary image may be an image in which respective pixels of the image are classified and expressed according to a predetermined criterion. For example, the binary image may bean image in which the image is expressed as black or white. For example, the binary image may be an image in which a pixel value included in the image is set to 0 or 1. The processor 120 may compare the pixel value of the image and a predetermined threshold value. The processor 120 may classify a pixel having a pixel value of a predetermined threshold value or more to a first class. The processor 120 may classify a pixel having a pixel value less than the predetermined threshold value to a second class. The first class and the second class may have a value of 0 or 1 or a color of black or white. The thresholding for the image may include, for example, global fixed thresholding, locally adaptive thresholding, and Hysteresis thresholding. For example, the processor 120 may create a black and white binary image by thresholding a grayscale image. For example, the original image X 242 may be the grayscale image. The concrete description of the image thresholding is just an example and the present disclosure is not limited thereto.

The image X' 244 may be the binary image. The image X' 244 may be an image represented by two values. For example, pixels included in the image X' 244 may be represented as a black (represented as 0 in an 8-bit color representation) or white (represented as 255 in the 8-bit color representation). As described above, the image X' 244 may also be represented as two other classes other than the black and the white.

The processor 120 may invert the binary image X' 244. The processor 120 inverts the binary image X' 244 to create an inverted image X" 246. The inverse of the binary image may be to invert a binary value included in the binary image. The inverse of the binary image may be to invert classes of pixels of the binary image. For example, the processor 120 may convert the pixel value included in the binary image from 0 to 1 and convert the pixel value from 1 to 0. For example, the processor 120 may convert the color of the pixel included in the binary image from white to black and convert the color from black to white.

The processor 120 may open the inverted image X" 246. The processor 120 opens the inverted image X" 246 to create an opened image X'" 248. In order to describe an opening operation, first, corrosion and dilation will be described.

The corrosion and the dilation may be operations performed in the image. The corrosion and dilation operations will be described below with reference to FIG. 7. The corrosion and dilation operations may be performed in the binary image. The corrosion and dilation operations may be associated with the binary image and a kernel. The kernel may be a size of a matrix. The kernel may be square or circular, for example. The binary image and the kernel may be expressed as a pixel matrix. The binary image may be, for example, an 800*600 pixel matrix, a 200*300 pixel matrix, or the like. The kernel may be, for example, a 5*5 pixel matrix, a 15*15 pixel matrix, or the like. The kernel may slide on the binary image similarly to convolution work in order to perform the corrosion or dilation operation. Referring to FIG. 7, a binary image 701 of an 8*8 pixel matrix and a kernel 701 of a 3*3 pixel matrix are illustrated. FIG. 7 is a diagram illustrating an exemplary embodiment of the corrosion operation. The corrosion may be a work which is performed within a range of the kernel 710. The corrosion operation may be, for example, an operation in which when all of pixel values of nine columns of the kernel 710 are 1, the pixel values of nine columns are recorded in the image as 1 as they are. For example, the processor 120 may record all pixels of nine columns in the image as 0 when at least one of the pixel values of nine columns of the kernel 710 is 0. Alternatively, for example, the processor 120 may record a center pixel value among nine columns in the image as 0 when at least one of the pixel values of nine columns of the kernel 710 is 0. For example, since six pixel values of 0 among the pixel values of nine columns of the kernel 710 of the first image 701 in FIG. 7 are included, the processor 120 records all of the pixel values of nine columns as 0 to create a second image 702. Sine all of the pixel values of nine columns of the kernel 710 of a third image 703 are 1, the processor 120 records the pixel values of nine columns as 1 as they are to create a fourth image 704. The processor 120 represents even all of the pixel values of nine columns of the kernel 710 of a fifth image 705 as 0 to create a sixth image 706. The processor 120 may output a final image 707 by repeating the corrosion operation for the image. The final image 707 is an image in which the range of 1 is reduced by repeating the corrosion operation for the first image 701. The dilation operation may be an opposite operation to the corrosion operation. The dilation operation may be, for example, an operation in which when at least one of the pixel values of nine columns of the kernel 710 is 1, all of the pixel values of nine columns are recorded in the image as 1. Alternatively, for example, the dilation operation may be an operation in which when at least one of the pixel values of nine columns of the kernel 710 is 1, the center pixel value among the pixel values of nine columns are recorded in the image as 1. When the dilation operation is repeated for the first image 701, the range of 1 may be increased. In other words, the corrosion operation may increase a white region in the binary image. The corrosion operation may increase the size or a thickness of a foreground object. The dilation operation may increase a black region in the binary image. The dilation operation may decrease the size or thickness of the foreground object. The dilation operation may increase the size of a background. The detailed description of the corrosion and dilation is just an example and the present disclosure is not limited thereto.

The opening may be a combination of the corrosion and dilation operations. The processor 120 may apply the corrosion operation to the image and thereafter, apply the dilation operation for the opening operation. The opening may be an operation for removing noise included in the image. The opening may be an operation for removing the noise included in the background of the image. The processor 120 may remove features having a small size by decreasing the sizes of the features having the small size, which are included in the image through the corrosion operation. Thereafter, the processor 120 increases the size of unremoved features included in the image through the dilation operation to preserve original sizes of the features. The opening may be an operation for removing the features having the small size and leaving only features having a large size. In other words, the processor 120 may remove features of a predetermined threshold size or less included in the image through the opening operation. Since the dilation operation is performed after the corrosion operation in the opening, the processor 120 may remove the noise included in the image and features having the small size or a small width. The detailed description of the opening is just an example and the present disclosure is not limited thereto.

Closing may be the combination of the dilation and corrosion operations. The closing may be an opposite operation to the opening. The processor 120 may apply the dilation operation to the image and thereafter, apply the corrosion operation for the closing operation. The closing may be an operation for removing small holes included in the foreground. The closing may be an operation for removing small black points included in an object. The processor 120 may increase the sizes of the features through the dilation operation. The processor 120 may remove a narrow gap between the features included in the image through the dilation operation. The processor 120 may smooth an unbalanced boundary of the object or features included in the image through the dilation operation. Thereafter, the processor 120 decreases the sizes of the features included in the image through the corrosion operation to preserve the original sizes of the features. In other words, through the closing operation, the processor 120 may remove the narrow gap or smooth the boundary of the feature in which a distance between two or more features is less than a predetermined length. The detailed description of the closing is just an example and the present disclosure is not limited thereto.

The foregoing description of corrosion, expansion, opening and closing operations is discussed in more detail in Erosion, dilation and related operators: Mariusz Jankowski, 2006, incorporated herein by reference in its entirety.

The processor 120 may perform a difference operation between the inverted image X" 246 and the opened image X''' 248. The processor 120 may perform a pixel wise subtraction operation between the inverted image X" 246 and the opened image X''' 248. The processor 120 subtracts the opened image X''' 248 from the inverted image X" 246 to create a preprocessed image X"" 249 (i.e., X""=X"–X'''). The processor 120 may determine a value obtained by subtracting the pixel value of the opened image X' 248 from the pixel value of the inverted image X" 246 as the pixel value of the preprocessed image X"" 249. The processor 120 may determine a difference value between pixels included in the same location of each of the inverted image X" 246 and the opened image X''' 248 as the value of the pixel at the same location of the preprocessed image X"" 249.

The processor 120 may extract the non-flaw patch from the preprocessed image X"" 249.

In other words, the preprocessing operation may be as follows. X'=thresholding(X), X"=inverse(X'), X'''=opening (X"), X""=X"–X'''

Through the preprocessing operation, non-trivial non-flaw pixels included in the image may be represented as a first class value and the remaining pixels may be represented as a second class value. For example, the non-trivial non-flaw pixels included in the image may be represented as white and the remaining pixels may be represented as black. The processor 120 may extract the non-flaw patch based on the pixels represented as the first class value in order to extract the non-flaw patches effective for training. For example, the processor 120 may extract the non-flaw patch so as to include white pixels included in the image. For example, when the background and the flaw (e.g., crack) of the original image are represented as the black/dark color and a product (e.g., steel plate panel) is represented as a white/bright color, the preprocessing operation may be performed. For example, performance of a non-flaw path including more white pixels for neural network training may be enhanced. The processor 120 may extract a non-flaw patch including pixels of a predetermined number or a predetermined proportion or more, which have the first class value from the preprocessed image. In other words, all patches extracted from the image are not constructed by training data but only the non-flaw patch having the first class value is extracted from the preprocessed image to construct the extracted non-flaw patch as the training data. The concrete description of the patch is just an example and the present disclosure is not limited thereto.

The preprocessing according to an exemplary embodiment of the present disclosure may include a thresholding step, a closing step, a difference operation step, and an inverse step for the image.

The processor 120 may create a binary image X' by thresholding an original image X. The processor 120 closes the binary image X' to create a closed image X". The processor 120 performs a difference operation of subtracting the closed image X" from the binary image X' to create a differential image X''' (X'''=X'–X"). The processor 120 inverts a binary value included in the differential image X''' to create a preprocessed image X"". The processor 120 may extract the non-flaw patch from the preprocessed image X"".

FIG. 6 is an image exemplarily illustrating a preprocessing method of an image. FIG. 6 is an image exemplarily illustrating the image of each step shown in the flowchart of FIG. 5. Through preprocessing, a non-flaw patch for constructing an effective training data set may be extracted from the image.

The non-flaw patch may be randomly extracted from the non-flaw image according to an exemplary embodiment of the present disclosure. However, when the non-flaw patch is randomly extracted from the non-flaw image, it may be difficult to select a good non-flaw pixel due to characteristics of an image of a product (e.g., panel). For example, the reason is that the background of the product image represented as black occupies most of the region of the product image, and light is reflected and the product represented as white on the image occupies a small partial region of the product image. Moreover, in the training of the neural network model, only a very small part of a product region included in the product image may include meaningful information. Thus, most of the randomly selected non-flaw patches may be meaningless to the training. In addition, training data sets including randomly selected non-flaw patches may include a large number of meaningless training data. As a result, the number of meaningful training data among the training data included in the training data set may be much smaller than the number of meaningless training data. When the non-flaw patch is extracted from the preprocessed image as described above, a training data set including a balanced number of patches for each of the non-flaw and flaw classes may be constructed. Further, the neural network model trained by the training data set including the non-flaw patch extracted from the preprocessed image may output effective performance. Therefore, a preprocessing motion for the image may remove unnecessary data and enhance the performance of neural network training.

Even in an inference process, a classification target image may be preprocessed. The opening operation for the classification target image may be performed through the preprocessing. Good candidate patches without the noise may be extracted through the opening operation for the classification target image. A black pixel included in the opened classification target image may be a pixel corresponding to the flaw in an original classification target image. A white pixel included in the opened classification target image may be a pixel corresponding to the background in the original classification target image. Accordingly, when the classification target image is preprocessed, the neural network model need not perform the operation for all patches included in the classification target image. In the preprocessed classification target image, whether the neural network model has the flaw is computed by selecting some patches including the white pixel to shorten an inference time of the classification target image.

Figure 8:
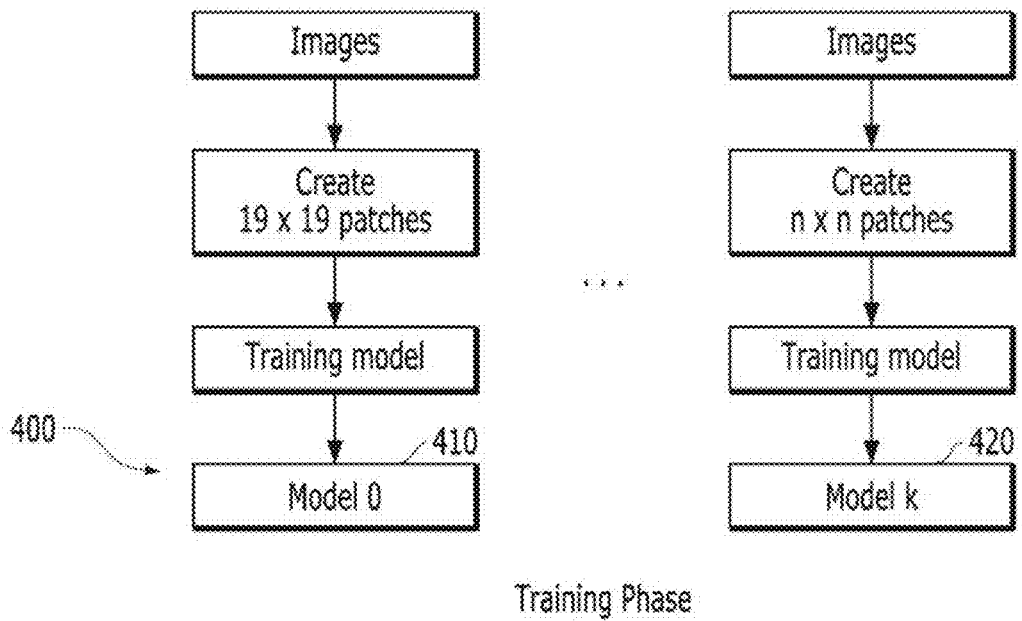
FIG. 8 is a diagram illustrating a method for training one or more models for flaw detection according to an exemplary embodiment of the present disclosure.

FIG. 8 is a diagram illustrating a method for training one or more models for flaw detection according to an exemplary embodiment of the present disclosure. The size of the flaw region included in the flaw image may be different. For example, the flaw region may correspond to one flaw pixel or a set of a plurality of flaw pixels. Therefore, when the neural network model is trained by a training data set including only patches of the same size, it may be difficult to detect the flaw for the image including flaw regions having various different sizes. For example, a neural network model trained by a training data set including a patch having a 19*19 pixel size may have the degraded flaw detection performance for an image including a flaw region having a size larger than the 19*19 pixel size.

According to an exemplary embodiment of the present disclosure, the processor 120 may train a plurality of neural network models 400 by using a training data set including patches having a plurality of different sizes. The processor 120 may train different neural network models for each patch size. For example, a first neural network model 410 may be trained by the patches having the 19*19 pixel size. A K-th neural network model 420 may be trained by patches having an n*n pixel size.

According to an exemplary embodiment of the present disclosure, the patches may have a square shape (e.g., m*n pixel size), a circular shape, or other shapes or sizes. Different neural network models may be used according to each of the type or size of image or patch.

Figure 9:
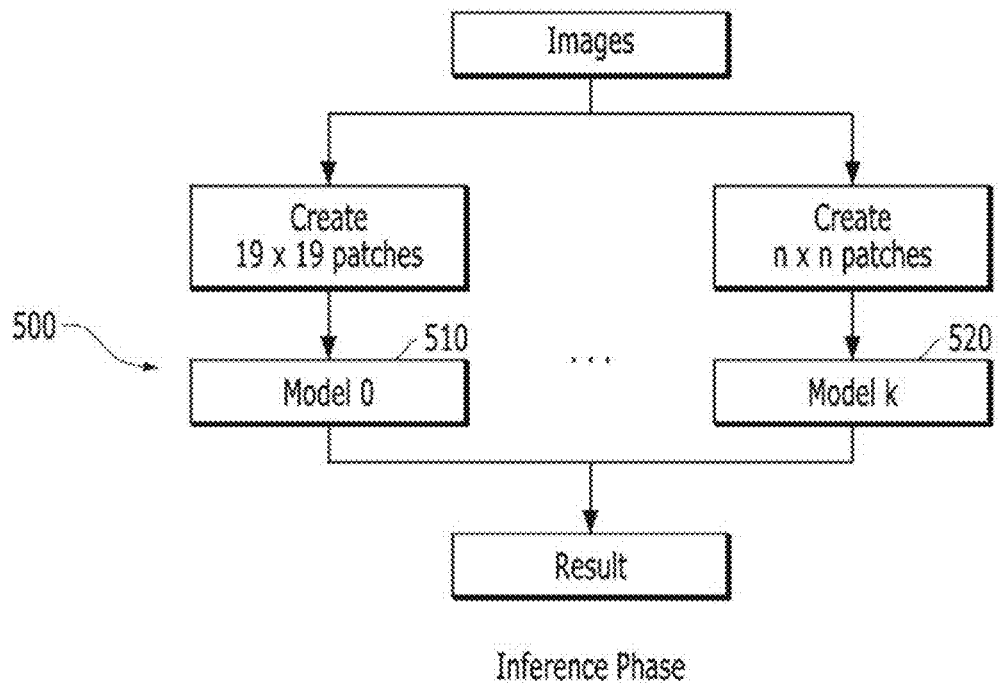
FIG. 9 is a diagram illustrating a method for detecting flaws using one or more models according to an exemplary embodiment of the present disclosure.

FIG. 9 is a diagram illustrating a method for detecting flaws using one or more models according to an exemplary embodiment of the present disclosure. The processor 120 may detect whether the classification target image has the flaw by using a plurality of neural network models 500. The processor 120 may extract patches with a plurality of sizes from one classification target image. The processor 120 may compute each of the patches having the plurality of sizes by using the model for each patch size. For example, when the size of the patch extracted from the classification target image is the 19*19 pixel size, the processor 120 may compute the patch by using a first neural network model 510. In addition, when the size of the patch extracted from the classification target image is the n*n pixel size, the processor 120 may compute the patch by using a K-th neural network model 520. The processor 120 may determine whether the classification target image has the flaw based on whether patches output from the plurality of neural network models 500, respectively have the flaw. When a flaw threshold number or more of patches output from the plurality of neural network models 500, respectively are output as the flaw patches, the processor 120 may determine the classification target image as the flaw image including the flaw. When it is determined whether the image has the flaw by using a plurality of models, accuracy of flaw detection, efficiency, and/or convenience of image patch size selection may be enhanced.

Figure 10:
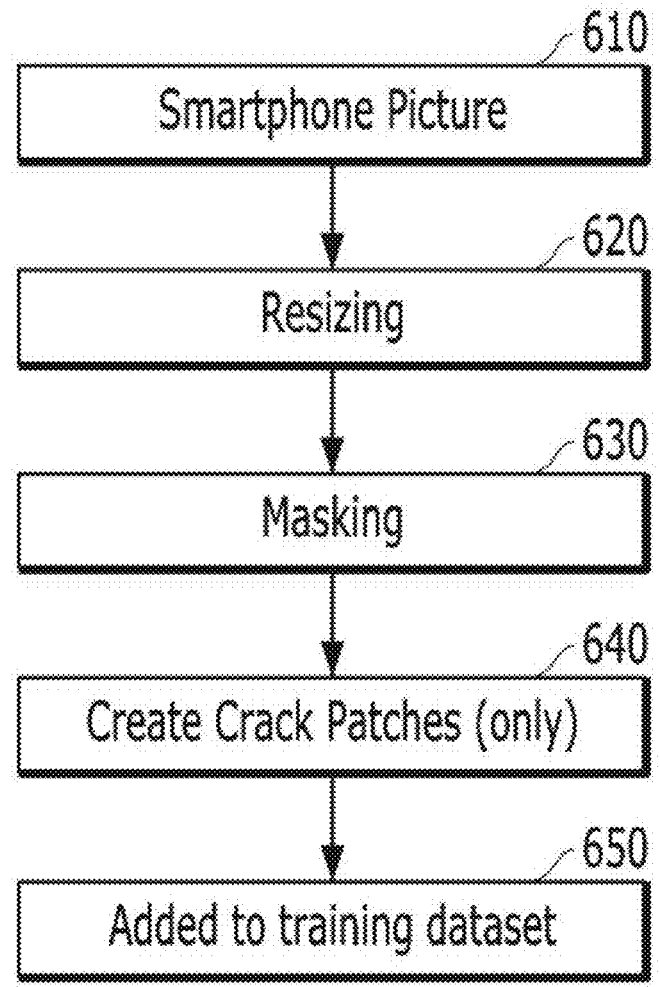
FIG. 10 is a flowchart illustrating a method for creating additional training data according to an exemplary embodiment of the present disclosure.

FIG. 10 is a flowchart illustrating a method for creating additional training data according to an exemplary embodiment of the present disclosure. The processor 120 may add an image obtained during the manufacturing process or patches extracted from the image to the training data set. For example, the non-flaw image and the flaw image included in the training data set may be an image for the product obtained after the manufacturing process is completed. The processor 120 may compute the image for the product obtained during the manufacturing process by using the trained neural network model. When the image obtained during the manufacturing process has the flaw as a result of computation using the neural network model, the processor 120 may determine to add the image obtained during the manufacturing process to the training data set. When it is determined that the image obtained during the manufacturing process has the flaw even before the manufacturing process is completed, the processor 120 may encapsulate the corresponding image in the training data set. The processor 120 may encapsulate the image obtained during the manufacturing process or patches extracted from the image in the training data set. The image obtained during the manufacturing process may be an image captured (610) by a device in the middle of the process. For example, the image obtained during the manufacturing process may be an image captured by a hand-held device such as a smart phone, etc. The processor 120 may adjust the size of the image obtained during the manufacturing process to the same size as the non-flaw image or flaw image of the training data set (620). The processor 120 may label the flaw region of the image obtained during the manufacturing process (630). The processor 120 may create the flaw patches based on the labeled flaw region (640). In this case, only the flaw patch may be extracted from the image obtained during the manufacturing process and the non-flaw patch may not be extracted. The processor 120 may add the flaw patch extracted from the image obtained during the manufacturing process to the training data set (650). The processor 120 may update the neural network model by using a reinforced training data set. When the training data set is reinforced by using the image obtained during the manufacturing process, the flaw patches are further added to balance the non-flaw and flaw classes of the training data and enhance neural network performance for flaw determination.

A computing device for providing the flaw detecting method or the training method of the neural network model for flaw detection according to an exemplary embodiment of the present disclosure may include a network unit 110, a processor 120, and a memory 130.

The network unit 110 may transmit and receive the non-flaw image, the flaw image, et., according to an exemplary embodiment of the present disclosure to and from other computing devices, servers, and the like. In addition, the network unit 110 may enable communication among a plurality of computing devices so that training of the network function is distributively performed in each of the plurality of computing devices. The network unit 110 enables communication among a plurality of computing devices so that computation for flaw detection using the network function is distributively performed.

The network unit 110 according to an exemplary embodiment of the present disclosure may use various wired/wireless communication systems.

The processor 120 may be constituted by one or more cores and may include processors for providing the neural network model, which include a central processing unit (CPU), a general purpose graphics processing unit (GPGPU), a tensor processing unit (TPU), and the like of the computing device. The processor 120 may read a computer program stored in the memory 130 to provide the neural network model according to an exemplary embodiment of the present disclosure. According to the exemplary embodiment of the present disclosure, the processor 120 may perform preprocessing of the image or patch for creating the training data set.

According to an exemplary embodiment of the present disclosure, the processor 120 may perform a calculation for training the neural network. The processor 120 may perform calculations for learning the neural network, which include processing of input data for learning in deep learning (DN), extracting a feature in the input data, calculating an error, updating a weight of the neural network using backpropagation, and the like. At least one of the CPU. GPGPU, and TPU of the processor 120 may process learning of a network function. For example, the CPU and the GPGPU may together provide training of the network function and the computation for flaw detection using the network function. Further, in an exemplary embodiment of the present disclosure, processors of a plurality of computing devices may be used together to provide the training of the network function and the computation for flaw detection using the network function. Further, the computer program executed in the computing device according to an exemplary embodiment of the present disclosure may be a CPU. GPGPU, or TPU executable program.

According to an exemplary embodiment of the present disclosure, the memory 130 may store any type of information generated or determined by the processor 120 or any type of information received by the network unit 110.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

A data structure may store data corresponding to a flaw detection algorithm according to an exemplary embodiment of the present disclosure.

Disclosed is a computer readable medium storing the data structure according to an exemplary embodiment of the present disclosure.

The data structure may refer to the organization, management, and storage of data that enables efficient access and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user thinks. The physical relationship between data elements may include an actual relationship between data elements physically stored on a computer-readable storage medium (e.g., hard disk). The data structure may specifically include a set of data, relationships between data, and functions or commands applicable to the data. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deck. The list may mean a series of data sets in which an order exists internally. The list may include a linked list. The linked list may be a data structure in which data is connected in a manner that each data is connected in a row with a pointer. In the connection list, the pointer may include connection information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data arrangement structure that may access data limitedly and unlike a stack, the queue may be a data structure (FIFO-First in First Out) in which late stored data is output late. The deck may be a data structure capable of processing data at both ends of the data structure.

The nonlinear data structure may be a structure in which a plurality of data are connected after one data. The nonlinear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning (hereinafter, unifiedly described as a neural network). The data structure may include the neural network. In addition, the data structures, including the neural network, may be stored in a computer readable medium. The data structure including the neural network may also include data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data input to the neural network, weights of the neural network, hyper parameters of the neural network, data obtained from the neural network, an active function associated with each node or layer of the neural network, and a loss function for training the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called node. The nodes may also be called neurons. The neural network is configured to include one or more nodes.

The data structure may include data input into the neural network. The data structure including the data input into the neural network may be stored in the computer readable medium. The data input to the neural network may include training data input in a neural network training process and/or input data input to a neural network in which training is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include data input into the neural network or data output from the neural network. The data structure including the data input into or output from the neural network may be stored in the computer readable medium. The data structure stored in the computer readable medium may include data input in a neural network inference process or output data output as a result of the neural network inference. In addition, the data structure may include data processed by a specific data processing method, and thus may include data before and after processing. Therefore, the data structure may include data to be processed and data processed through a data processing method.

The data structure may include weights of the neural network (weights and parameters may be used as the same meaning in the present disclosure). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the parameters set in the links corresponding to the respective input nodes. The data structure is just an example and the present disclosure is not limited thereto.

As a non-limiting example, the weight may include a weight which varies in the neural network training process and/or a weight in which neural network training is completed. The weight which varies in the neural network training process may include a weight at a time when a training cycle starts and/or a weight that varies during the training cycle. The weight in which the neural network training is completed may include a weight in which the training cycle is completed. Accordingly, the data structure including the weight of the neural network may include a data structure including the weight which varies in the neural network training process and/or the weight in which neural network training is completed. Therefore, it is assumed that the above-described weights and/or combinations of respective weights are included in the data structure including the weights of the neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconstructed in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 11:
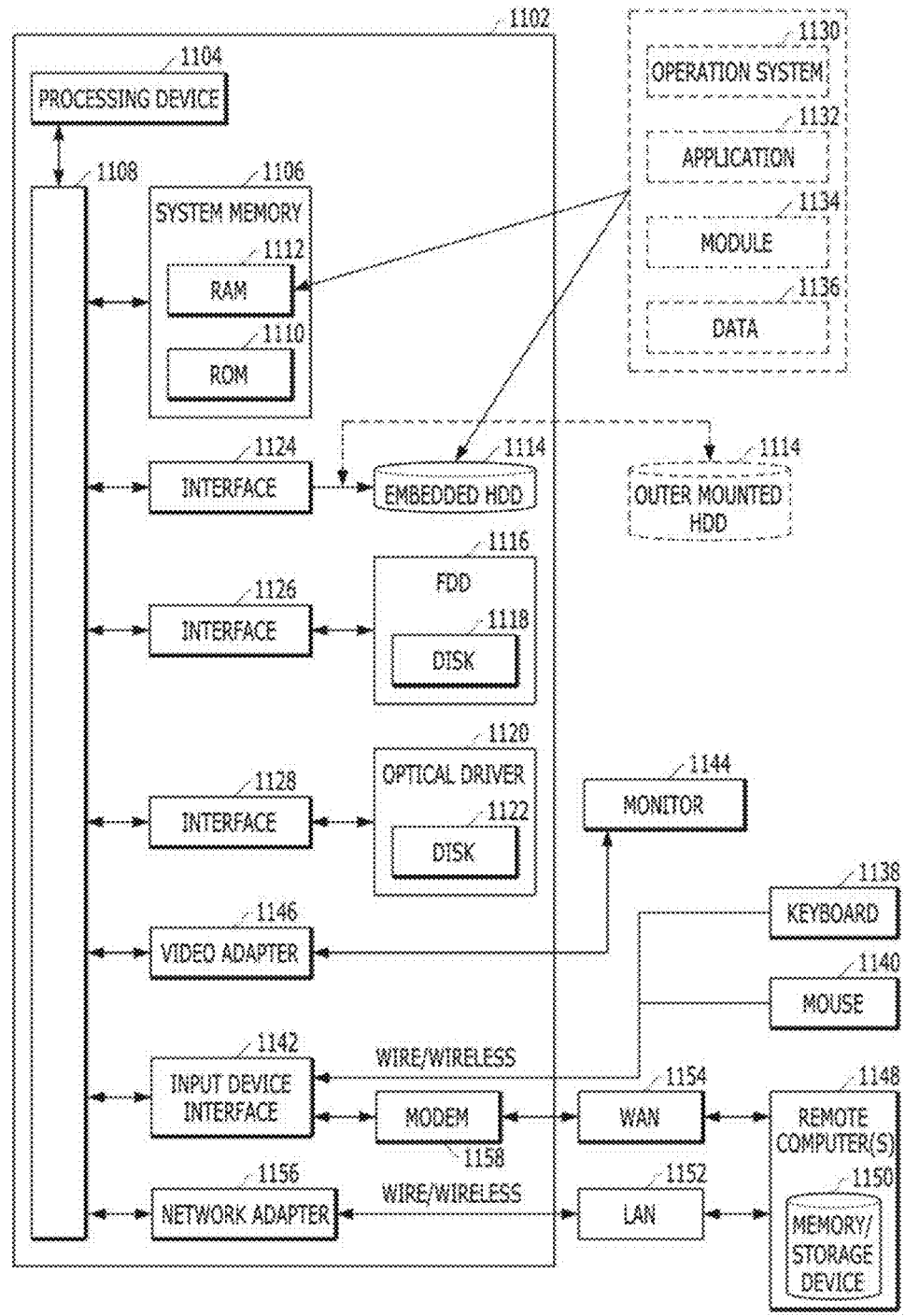
FIG. 11 is a block diagram of a computing device according to an exemplary embodiment of the present disclosure.

FIG. 11 is a block diagram of a computing device according to an exemplary embodiment of the present disclosure.

FIG. 11 illustrates a simple and general schematic view of an exemplary computing environment in which the exemplary embodiments of the present disclosure may be implemented.

The present disclosure has generally been described above in association with a computer executable instruction which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media Media accessible by the computer may be computer readable media regardless of types thereof. The computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a modulated data signal such as other transport mechanism and include all information transfer media. The term "modulated data signal" means a signal acquired by configuring or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, an apparatus, or a standard programming and/or engineering technique. The term "manufactured article" includes computer programs or media which are accessible by a predetermined computer-readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the embodiments presented herein, but should be analyzed within the widest range which is coherent with the principles and new features presented herein.

What is claimed is:

1. A non-transitory computer readable medium storing a computer program, wherein when the computer program is executed by one or more processors of a computing device, the computer program performs operations to provide methods for detecting flaws, and the operations comprise:
    extracting a flaw patch from a first flaw image including a flaw, wherein the first flaw image comprises one or more flaw regions and the operation of extracting the flaw patch comprises at least one of:
        extracting the flaw patch so that at least one of the flaw regions is included in a center of the flaw patch;
        extracting the flaw patch so that the at least one of the flaw regions is included in a boundary of the flaw patch; or
        extracting the flaw patch so that a predetermined number or more of flaw regions placed side by side continuously are included in the flaw patch;
    preprocessing at least one of the first flaw image or a non-flaw image not including a first flaw;

extracting a non-flaw patch from at least one of the preprocessed first flaw image or non-flaw image;

training a neural network model for classifying patches to flaw or non-flaw with a training data set comprising the flaw patch and the non-flaw patch; and determining, using the trained neural network model, a flaw threshold number indicating a minimum number of flaw patches included in an image for the image to be classified as a flaw image.

2. The computer program according to claim 1, wherein the flaw patch is portion region with a predetermined size extracted from the first flaw image, and wherein the non-flaw patch is portion region with a predetermined size extracted from at least one of the first flaw image or the non-flaw image.

3. The computer program according to claim 1, wherein the flaw patch comprises one or more flaw regions included in the first flaw image, and wherein the non-flaw patch doesn't comprise the one or more flaw regions included in the first flaw image.

4. The computer program according to claim 1, wherein the operation of extracting the flaw patch from the first flaw image including the flaw further comprises extracting the flaw patch so that a predetermined number or more of flaw regions are included in the flaw patch.

5. The computer program according to claim 1, wherein the operations further comprise preprocessing the flaw patch; and wherein the training data set comprises the preprocessed flaw patch.

6. The computer program according to claim 1, wherein the operation of preprocessing at least one of the first flaw image or the non-flaw image, comprises at least one of:
removing a noise included in a preprocessing target image which is at least one of the first flaw image or the non-flaw image;
removing a feature less than a predetermined size included in the preprocessing target image;
removing a gap between two or more features, if a distance of the two or more features included in the preprocessing target image is less than a predetermined distance; or
smoothing a boundary of a feature included in the preprocessing target image.

7. The computer program according to claim 1, wherein the operation of preprocessing at least one of the first flaw image or the non-flaw image, comprises:
converting a preprocessing target image, which is at least one of the first flaw image or the non-flaw image, to a binary image;
obtaining an inversed image by inverting a binary value included in the binary image;
obtaining an opened image by opening the inversed image; and
obtaining a preprocessed image including a difference value between the inversed image and the opened image.

8. The computer program according to claim 7, wherein the operation of obtaining an opened image by opening the inversed image, comprises removing a feature less than a predetermined size included in the inversed image.

9. The computer program according to claim 1, the operation of preprocessing at least one of the first flaw image or the non-flaw image, comprises:
converting a preprocessing target image, which is at least one of the first flaw image or the non-flaw image, to a binary image;
obtaining a closed image by closing the binary image;
obtaining a differential image including a difference value between the binary image and the closed image; and
obtaining a preprocessed image by inverting a binary value included in the differential image.

10. The computer program according to claim 9, wherein the operation of obtaining a closed image by closing the binary image, comprises at least one of:
removing a gap between two or more of features, when a distance of the two or more of features included in the binary image is less than a predetermined distance; or
smoothing a boundary of a feature included in the binary image.

11. The computer program according to claim 1, a proportion between a number of flaw patches and a number of non-flaw patches included in the training data set is determined by a predetermined balance proportion.

12. The computer program according to claim 1, wherein the operation of training the neural network model for classifying patches to flaw or non-flaw with the training data set comprising the flaw patch and the non-flaw patch, comprises training different neural network models for each patch size.

13. The computer program according to claim 1, wherein the operations further comprise:
extracting one or more patches from a classification target image;
classifying the one or more patches to flaw or non-flaw patch by computing using the trained neural network model;
determining a number of patches among the one or more patches are classified as flaw patches;
determining a second flaw is included in the classification target image when the number of flaw patches is at least the flaw threshold number; and
classifying the classification target image as a second flaw image.

14. The computer program according to claim 1, wherein the first flaw image and the non-flaw image are at least one of: a first image of a product after a manufacturing process is completed, or a second image of the product during the manufacturing process.

15. The computer program according to claim 1, wherein the operations further comprise:
computing a third image obtained during a manufacturing process by the trained neural network model;
extracting an additional flaw patch based on the third image obtained during a manufacturing process, when it is determined that a third flaw is included in the third image obtained during the manufacturing process; and
adding the additional flaw patch to the training data set.

16. A method for detecting flaws, comprising:
extracting a flaw patch from a first flaw image including a flaw, wherein the first flaw image comprises one or more flaw regions and extracting the flaw patch comprises at least one of:
extracting the flaw patch so that at least one of the flaw regions is included in a center of the flaw patch;
extracting the flaw patch so that the at least one of the flaw regions is included in a boundary of the flaw patch; or
extracting the flaw patch so that a predetermined number or more of flaw regions placed side by side continuously are included in the flaw patch;
preprocessing at least one of the first flaw image or a non-flaw image not including a first flaw;
extracting a non-flaw patch from at least one of the preprocessed first flaw image or non-flaw image;

training a neural network model for classifying patches to flaw or non-flaw with a training data set comprising the flaw patch and the non-flaw patch; and determining, using the trained neural network model, a flaw threshold number indicating a minimum number of flaw patches included in an image for the image to be classified as a flaw image.

17. A server for providing methods for detecting flaws, including:

a processor including one or more cores;

a memory; and wherein the processor is configured to perform operations comprising:

extracting a flaw patch from a first flaw image including a flaw, wherein the first flaw image comprises one or more flaw regions and the operation of extracting the flaw patch comprises at least one of:

extracting the flaw patch so that at least one of the flaw regions is included in a center of the flaw patch;

extracting the flaw patch so that the at least one of the flaw regions is included in a boundary of the flaw patch; or extracting the flaw patch so that a predetermined number or more of flaw regions placed side by side continuously are included in the flaw patch;

preprocessing at least one of the first flaw image or a non-flaw image not including a first flaw;

extracting a non-flaw patch from at least one of the preprocessed first flaw image or non-flaw image;

training a neural network model for classifying patches to flaw or non-flaw with a training data set comprising the flaw patch and the non-flaw patch; and determining, using the trained neural network model, a flaw threshold number indicating a minimum number of flaw patches included in an image for the image to be classified as a flaw image.

18. A non-transitory computer readable medium storing data structure corresponding to a parameter of a neural network at least partially updated in training processes, wherein operations of the neural network are based on at least partially the parameter, and the training process comprises:

extracting a flaw patch from a first flaw image including a flaw, wherein the first flaw image comprises one or more flaw regions and the operation of extracting the flaw patch comprises at least one of:

extracting the flaw patch so that at least one of the flaw regions is included in a center of the flaw patch;

extracting the flaw patch so that the at least one of the flaw regions is included in a boundary of the flaw patch; or extracting the flaw patch so that a predetermined number or more of flaw regions placed side by side continuously are included in the flaw patch;

preprocessing at least one of the first flaw image or a non-flaw image not including a first flaw;

extracting a non-flaw patch from at least one of the preprocessed first flaw image or non-flaw image;

training a neural network model for classifying patches to flaw or non-flaw with a training data set comprising the flaw patch and the non-flaw patch; and determining, using the trained neural network model, a flaw threshold number indicating a minimum number of flaw patches included in an image for the image to be classified as a flaw image.

* * * * *